United States Patent [19]
Smeda et al.

[11] 3,921,310
[45] Nov. 25, 1975

[54] INTERCONNECTED RESPONSE RECORDING AND DISPLAY CONSOLES

[75] Inventors: Ralph Smeda, Reston, Va.; Marvin I. Mindell, Pittsford; William T. Daly, Rochester, both of N.Y.

[73] Assignee: The Singer Company, New York, N.Y.

[22] Filed: Aug. 21, 1974

[21] Appl. No.: 499,244

[52] U.S. Cl. ................................. 35/8 R; 35/22 R
[51] Int. Cl.² ........................................... G09B 5/00
[58] Field of Search........ 35/8 R, 22 R, 30; 200/314

[56] References Cited
UNITED STATES PATENTS

| | | | |
|---|---|---|---|
| 2,931,108 | 4/1960 | Brown | 35/5 |
| 3,080,661 | 3/1963 | Conrath | 35/6 |
| 3,271,530 | 9/1966 | Wirsching | 200/314 |
| 3,355,821 | 12/1967 | Buenger | 35/30 |
| 3,600,592 | 8/1971 | Mahan et al. | 35/5 |
| 3,600,826 | 8/1971 | Thomas | 35/22 R |
| 3,660,913 | 5/1972 | Heath | 35/30 |
| 3,663,780 | 5/1972 | Golbeck | 200/314 |

*Primary Examiner*—Wm. H. Grieb
*Attorney, Agent, or Firm*—Charles R. Lewis

[57] ABSTRACT

A group of interconnected consoles each having a plurality of keys in the form of a keyboard and an indicator lamp associated with each key position for the selective anonymous transmitting and receiving of keyboard responses between the members of a group adaptable to a variety of group communication situations including testing, training, education and evaluation.

Each keyboard and the associated indicator lamps are shielded from the view of anyone other than the operator of the console by both the physical placement of the consoles and a console observation shield. Each group member may depress one or more keys to record his response to printed instructions adjacent each key; elect to transmit lamp illuminating signals representing each depressed key to an associated lamp on each of the other consoles, thus transmitting evidence of his keyboard responses to all the other group members; and receive lamp illuminating signals representing depressed keys from a transmitting console, thus receiving evidence of the keyboard responses of another group member. The group members receiving lamp illuminating signals observe a lamp illuminate for each key position corresponding to a depressed key on the transmitting keyboard but cannot associate the appearance of an illuminated lamp with a group member. Thus, each group member choosing to transmit evidence of his keyboard responses has assurance of anonymity.

21 Claims, 17 Drawing Figures

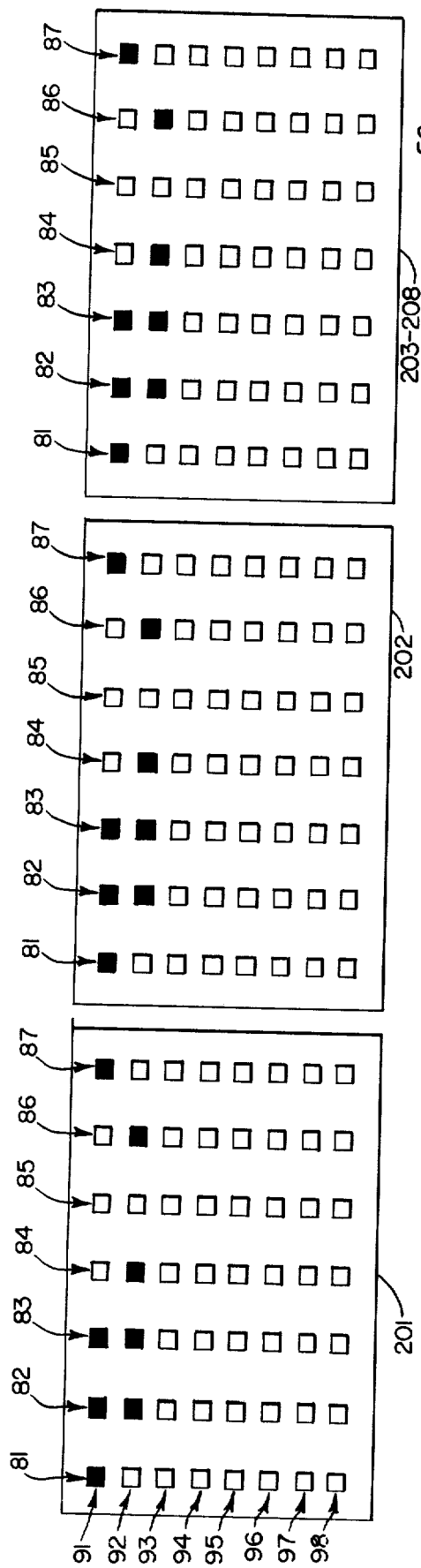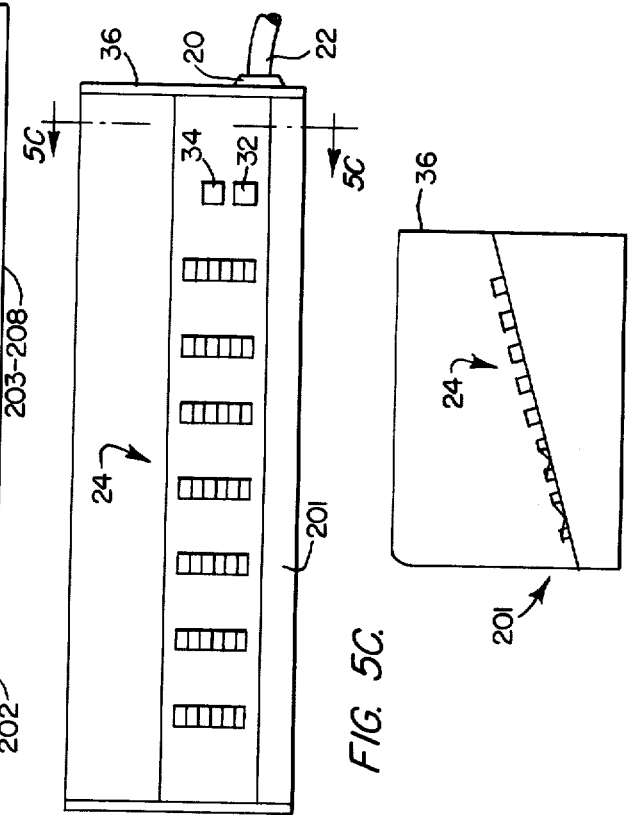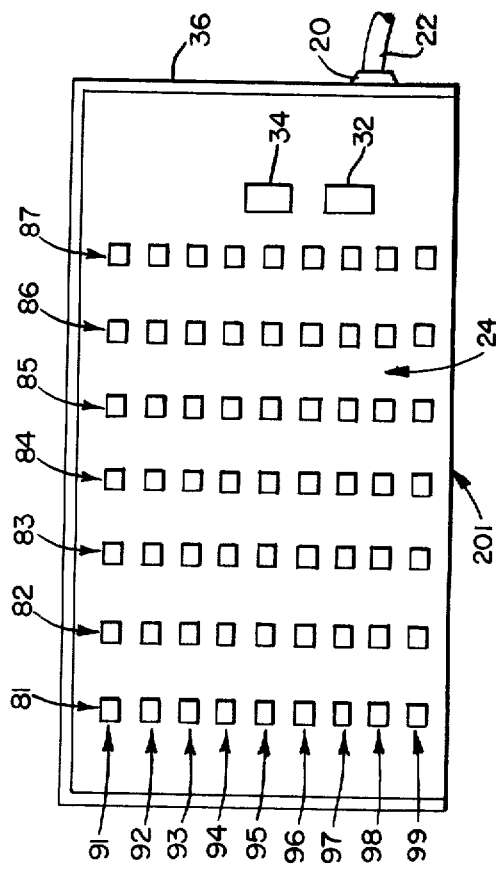
FIG. 4C.
FIG. 5B.
FIG. 5C.
FIG. 5A.

INTERCONNECTED RESPONSE RECORDING AND DISPLAY CONSOLES

BACKGROUND OF THE INVENTION

1. Field of the Invention

The present invention relates to a group of individually operated consoles, operably coupled through an interconnection means, each having a plurality of keys in the form of a keyboard, and an indicator lamp associated with each key position whereby the operator of each console may anonymously transmit lamp illuminating signals representing depressed keys to an associated indicator lamp on all the other consoles and receive lamp illuminating signals representing a depressed associated key from an unidentifiable transmitting console.

2. Prior Art

In the field of human communication it is frequently beneficial for a number of people to assemble together to form into a group whereby each person may communicate with the other to gain the benefit of each others knowledge and opinion. Group communication is beneficial in the training, education, testing, and evaluation of people as well as in many other areas of human endeavor.

As the number of people within the group increases, effective communication between a member of the group and the remaining group members, as well as effective communication between the group and a single group member becomes more difficult. As the number of members of the group increases the number of possible messages increases thereby taxing the ability of any one group member to sort out and understand the numerous messages. Also, the individual communication peculiarities such as difficulty in speaking, verbosity, and perceptive problems make it difficult for some individuals to communicate to the whole. For resons to be explained and demonstrated in illustrative examples to follow it is often advisable to allow a group member to de-personify his message, that is, transmit a message to the remainder of the group in an anonymous manner. The group members receiving the de-personified message would not be able to determine the identity of the person sending the message. The following examples illustrate a few of the many problems that can arise in group communication situations.

In the case where a single group member receives the opinion of all the remaining group members with respect to some arbitrary subject matter, the remaining group members may transmit their message (e.g., by speaking) concurrently or consecutively. If the information is transmitted concurrently the single group member must simultaneously sort a plurality of messages. This becomes impossible as the number of transmitting group members increase. If the messages are transmitted consecutively, the information transfer is time consuming and if the number of group members is large, the first message may be forgotten by the time the last one is received. The following example illustrates. In a group consisting of eight members A, B, C, D, E, F, G and H, group members A to G are to give their opinion as to some arbitrary subject matter to H. If A to G speak concurrently, H would not be able to sort out the many different messages. If A to G were to speak consecutively, H may forget A's opinion by the time he has listened to G's opinion.

In the case where the message sought to be transmitted have an information content that is embarrassing to the group member transmitting the message, the embarrassed group member may be reluctant to communicate. This reluctance does not serve the communication purposes of the group. Returning to the group of eight members, A to H, recited above, E is requested to give his opinion as to the sociability of B. E finds it embarrassing to speak about another's sociability and peculiarly embarrassing to speak about B's sociability. Because of this embarrassment, E refuses to communicate or communicates false non-embarrassing information. E would communicate if the message could be depersonified to allow E to maintain his anonymity.

In the case where the entire group is asked to give their consensus by simultaneously raising their hands one or more group members may lag in transmitting their response in order to observe the response of one or more particular group members. The group member who has lagged in order to observe may then respond in order to be a member of the majority, a member of the minority, duplicate the response of one or more particular group members, or not duplicate the response of one or more particular group members. A group member may choose to first observe and then respond for a number of reasons. The group member may have a compelling need to conform to the majority, or may have a compelling need to conform to the minority, he may have a need to seek the approval of one or more group members, or avoid the disapproval of one or more group members. In a case where the majority of the group members tend to modify their responses after a brief observation period, it is difficult, if not impossible, to obtain an honest consensus from each group member.

The problem is made more severe when dealing with non-peer groups, e.g., where one or more members of the group possesses a great deal of power or authority in relation to the other group members. In this case, one or more group members may observe the displayed response of the group member possessing the greater power or authority and then modify their reponse to conform or not conform to the response of the group member possessing the power or authority. The group member modifying his response may do so to obtain the approval or disapproval of the group member possessing the superior amount of power or authority.

The problem is aggravated when one member of the group is rated or appraised with respect to some characteristic by all the remaining members of the group. A group member may modify his response in order to conform or not conform with the majority, seek the approval or disapproval of one or more peer or non-peers, or seek the approval or disapproval of the group member being rated. Such conflicts may place a group member under anxiety and may cause the group member to withdraw from active involvement with the group.

The following examples are illustrative of the above problems.

A group consists of eight members; A, B, C, D, E, F, G and H, who are asked by a group leader to raise their hand to indicate acceptance of a proposition. Because of group member B's compelling need to conform to the majority, B waits until the remainder of the group has displayed its response and then joins the majority.

In a variation of this situation, D may wait until C displays his response and then duplicates the response of C in order to obtain the approval or avoid the disapproval of C. By way of example, D and C may be members of the same family, friends, or a married couple.

In still another variation of this situaton, H is a group member who possesses power or authority in relation to the remainder of the group. E may wait until H responds and then E may duplicate the response of H in order to avoid conflict with the more powerful H. By way of example, H may be a military officer, teacher, or supervisor, and E may be an enlisted person, student, or employee.

The above examples are merely illustrative of some of the many and varied communication problems which may arise within a group.

There is a need for an apparatus for use by the members of a group which assists in providing convenient intra-group communication and having a mode which allows a group member to depersonify a message.

SUMMARY OF THE INVENTION

A group of individually operated interconnected response recording and response displaying consoles enable the selective and anonymous transmitting and receiving of responses between the operators of the consoles. Each console operator may actuate one or more response recording means to record his response, observe an indicating response display means as evidence of his response, elect to anonymously transmit response display signals from the actuated response recording means on his console to an associated response display means on all the consoles as evidence of his responses, and receive response display signals transmitted to response display means on his console by associated actuated response recording means on an unidentifiable transmitting console or consoles.

Each console comprises a plurality of systematically positioned response recording means reversibly actuable to a response recording state, a response display means associated with each response recording means position to display an indication of a response, and means for the console operator to elect to anonymously transmit response display signals from actuated response recording means to all the associated response display means on each console, and means to receive response displaying signals anonymously from actuated response recording means on a transmitting console.

BRIEF DESCRIPTION OF THE DRAWINGS

The present invention will be fully understood from consideration of the following detailed description taken in conjunction with the accompanying drawings, in which like reference characters refer to the like parts in the several views, and wherein;

FIG. 4C is a schematic plan view similar to FIG. 4B showing three keyboards having fity-six keys each with selected keys darkened to illustrate a response indicating condition, FIG. 5A is a top view of a typical response recording and display console, FIG. 5B is a frontal view of the typical response recording and display console illustrated in FIG. 5A, FIG. 5C is a partial cross section side view of the response recording and display console illustrated in FIG. 5B taken along line 5C—5C.

DESCRIPTION OF THE PREFERRED EMBODIMENT

Figure 1:
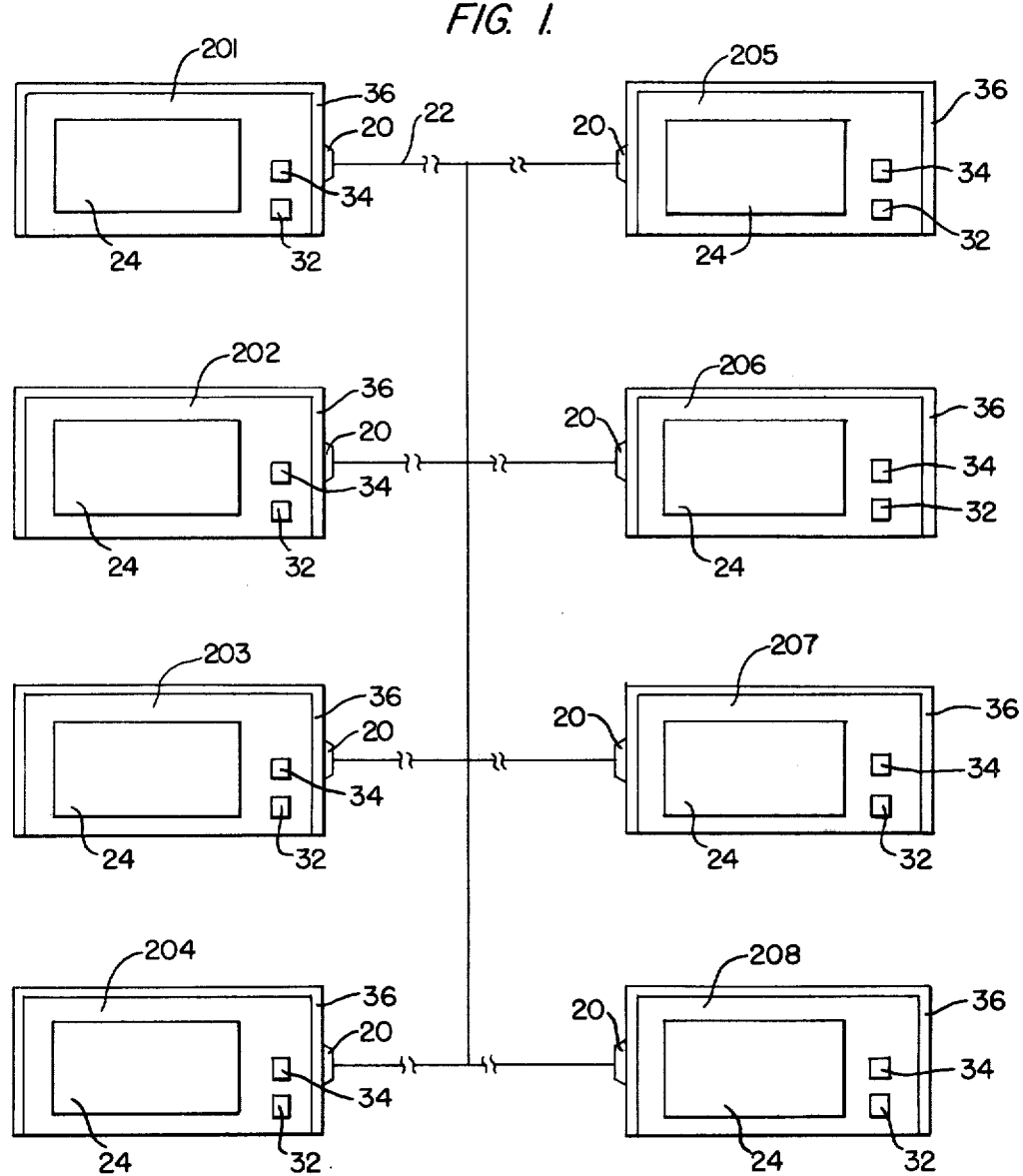
FIG. 1 is a schematic plan view showing eight response recording and display consoles and interconnection means.
Figure 2:
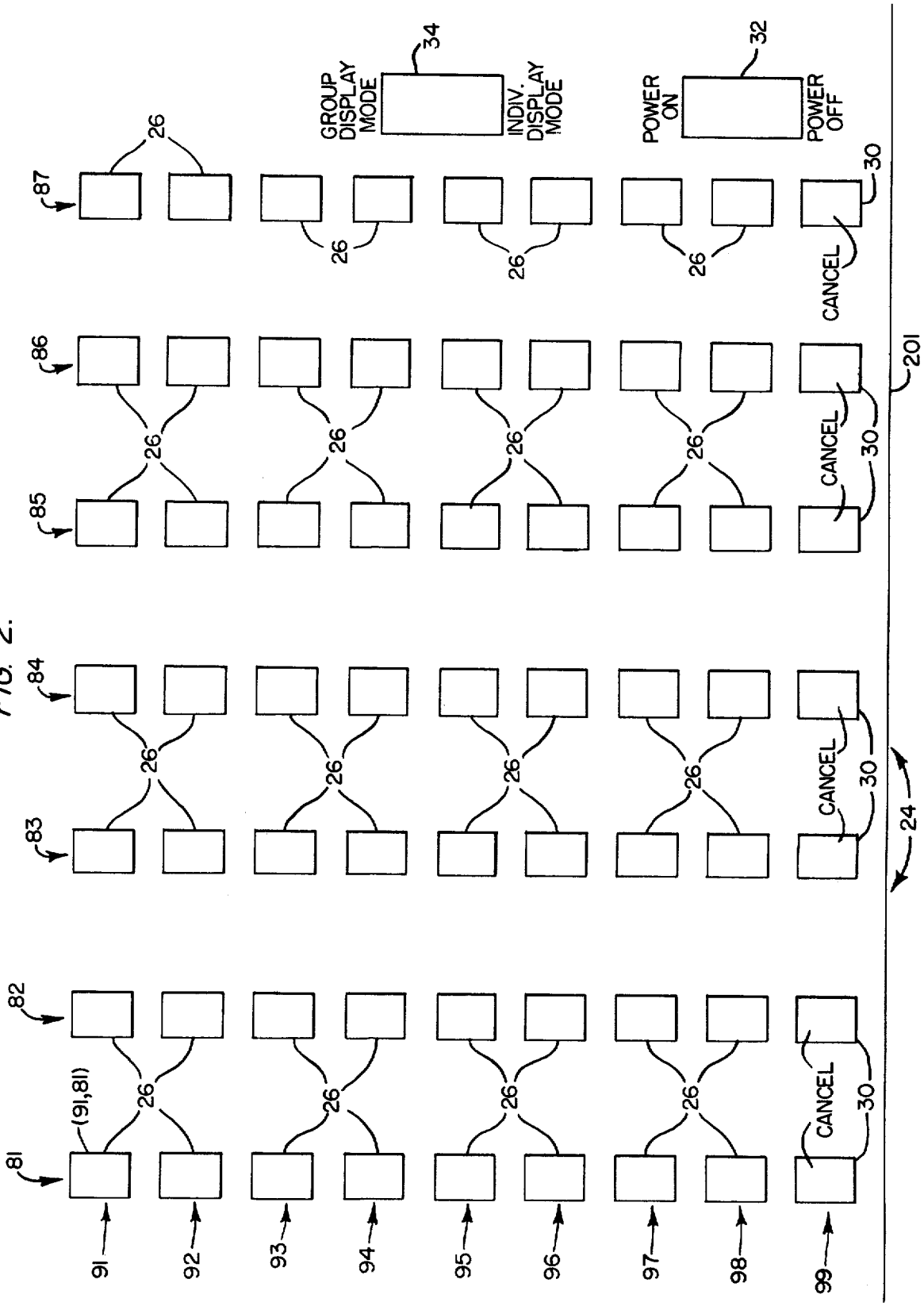
FIG. 2 illustrates a typical keyboard for a response recording and displaying console.
Figure 6:
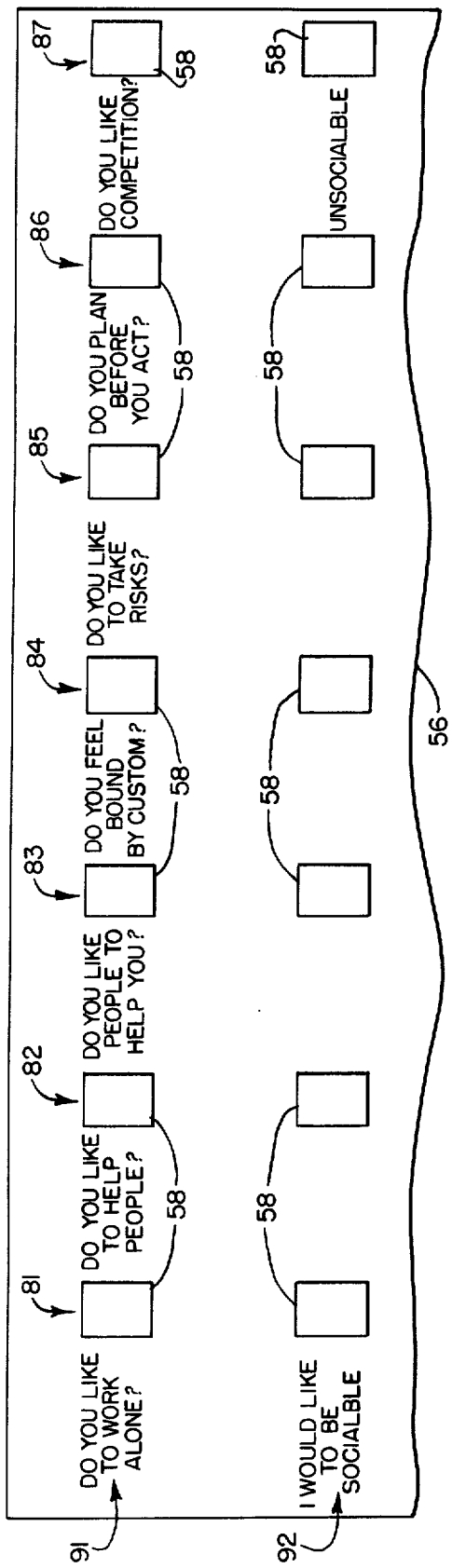
FIG. 6 is a partial top view of a template having two rows of key apertures with representative questions adjacent selected apertures.

As shown in FIG. 1, a preferred embodiment in accordance with the present invention may include eight response recording and display consoles 201, 202, 203, 204, 205, 206, 207 and 208 interconnected through electrical connectors 20 and an electrical cable 22. As best shown in FIG. 2, each of the consoles 201-208 has a keyboard 24 which may have seven columns 81, 82, 83, 84, 85, 86, 87 and eight rows 91, 92, 93, 94, 95, 96, 97, and 98 of actuatable and indicating keys 26. The group of consoles 201-208 may be utilized by a group of people, one person to a console, to communicate keyboard 24 responses to one another. Each one of the consoles 201-208 should be positioned so that each group member can readily verbally communicate with other group members, but cannot observe the operation of another group member's keyboard 24. A preferable placement is to mount each console on a table, the tables being arranged to form a circle. Each group member then sits at a table facing the other group members but cannot readily observe a keyboard 24 other than his own. An operator depresses a key 26 depending upon the significance attached to each depressed key 26 by printed statements adjacent to each key 26. As shown in FIG. 6, the printed statements are carried on a replaceable template 56. FIG. 6 illustrates the upper portion of a template 56. The printed statements shown are merely representative of the many types of statements which may be utilized. The questions in the row 91 may be responded to by depressing the adjacent key 26. The statements in the row 92 may be responded to by depressing one of the keys 26 to indicate the relative magnitude of the opertor's feeling.

The template 56 is a thin sheet of material, preferably paper, having dimensions approximately equal to the dimensions of the keyboard 24 and having apertures 58 corresponding in position to the position of each key 26 on the keyboard 24. Each aperture 58 has dimensions larger than the dimensions of each key 26 such that a key 26 may extend through an aperture 58 to be surrounded by the solid portion of the template 56. A template 56 suitable for use with the preferred embodiment would have seven columns and eight rows of apertures 58. A portion of each template 56 adjacent to and to the left of each aperture 58 receives printed matter relating to the use of each key 26. The printed matter may include bivalue questions as illustrated in the row 91 of FIG. 6 or multivalue questions as illustrated in the row 92 of FIG. 6. The bi-value questions may be responded to by depressing the key 26 adjacent to the instruction and the multi-value question may be responded to by depressing one key 26 in the row 92 as evidence of the magnitude of a response. Since the template 56 is easily placed over and removed from the keyboard 24, many different sets of templates 56 may be prepared, each set of templates 56 relating to a different group communication situation. The ready replaceability of the templates 56 and the ease with which they may be manufactured make the group of consoles 201-208 adaptable to a wide variety of group communication situations.

Hereinafter, when referring to a console in the generic sense, the work console will be used without an appended reference numeral; when referring to a structure or characteristic common to all the consoles 201-208, the console 201 will be described; and when referring to the relationship between one console and the remaining seven consoles, the console 201 will be described in relation to the remaining consoles 202-208.

Figure 3A:
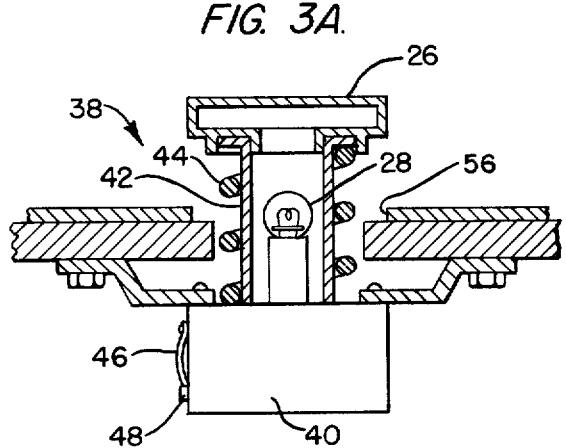
FIG. 3A is a cross section view of a typical keyboard key switch and indicator assembly.

Each key 26 may be manually actuated to a response recording position, is made of a translucent material, and as shown in FIG. 3A, has an illuminatable lamp 28 located below the key 26 surface. When any key 26 is depressed to the response recording position the lamp 28 beneath the depressed key 26 illuminates by means of electrical circuitry to be discussed below. The illuminated lamp 28 serves to indicate a response to the operator of the console. In addition, each operator may elect to transmit lamp 28 illuminating signals representing depressed keys 26 on his console to lamps 28 associated with the depressed keys 26 on each of the other consoles, thus transmitting evidence of his keyboard 24 responses to the other console operators, and each operator may receive lamp 28 illuminating signals representing depressed keys 26 from a transmitting console, thus receiving evidence of the keyboard 24 responses of another console operator. Since the operator of any console cannot readily associate the appearance of an illuminated lamp 28 on his console with another console operator, each console operator has a reasonable assurance of anonymity in transmitting lamp 28 illuminating signals from his console to the other consoles.

Figure 4A:
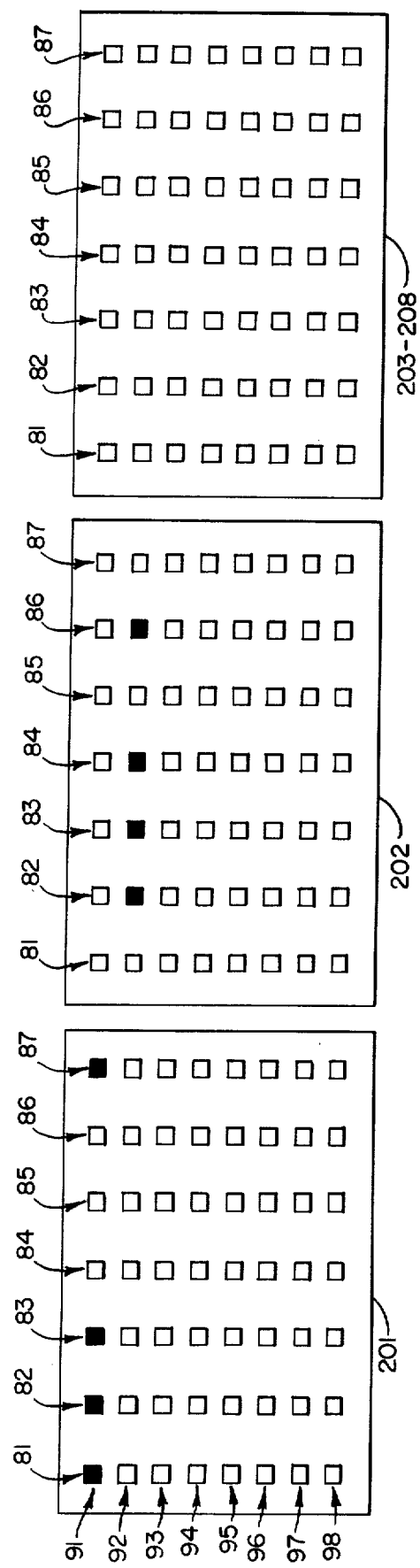
FIG. 4A is a schematic plan view showing three keyboards having fifty-six keys each with selected keys darkened to illustrate a response indicating condition.
Figure 4B:
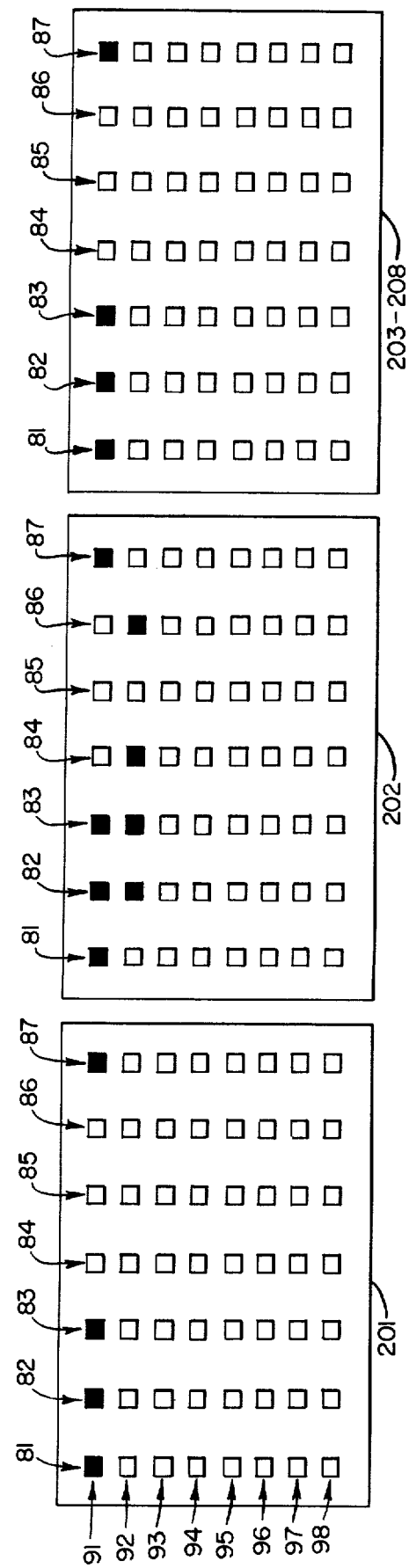
FIG. 4B is a schematic plan view similar to FIG. 4A showing three keyboards having fifty-six keys each with selected keys darkened to illustrate a response indicating condition.

The following example which illustrates only one method of using the present invention is presented for the purpose of describing the invention including the response recording feature of each of the consoles 201-208, an individual display mode whereby an operator only receives lamp 28 illuminating signals from other consoles, and a group display mode whereby an operator may transmit lamp 28 illuminating signals to other consoles as evidence of his keyboard 24 responses. The consoles 201, and 202 will be described in relation to the consoles 203-208. The location of a key 26 on a keyboard 24 will hereinafter be identified by its row number, a semi-colon, and its column number, with both in parenthesis. For example, the position of the first key 26 in the first column will be identified as (91;81) as shown in FIG. 2. In accordance with the method used in this illustrative example, the operator of each console 201-208 is assigned a specific row in which to respond and must restrict his responses to that row. The operator of the console 201 is assigned the row 91, the operator of the console 202 is assigned the row 92, the operator of the console 203 is assigned row 93, the operator of the console 204 is assigned the row 94, the operator of the console 205 is assigned the row 95, the operator of the console 206 is assigned the row 96, the operator of the console 207 is assigned the row 97 and the operator of the console 208 is assigned the row 98. Assigning each operator a row is one method of preserving the anonymity of each operator. Aside from knowing his own row number, the operator of a console does not know what row has been assigned to the other console operators. For example, the operator of the console 201, assigned to the row 91, cannot readily associate an illuminated lamp 28 in the rows 92-98 with another operator. In this example only the response recording, response receiving, and response transmitting features of the consoles 201 and 202, and the response receiving features of the consoles 203-208 will be described. It is to be understood that the description of the response recording and response transmitting features of the consoles 201 and 202 applies equally well to the consoles 203-208. With all the consoles 201-208 operating in the individual display mode (by means to be described below), the operator of the console 201 depresses the key 26 in the positions (91;81), (91;82), (91;83), and (91;87) and the corresponding lamps 28 located below each depressed key 26 illuminate as illustrated by the darkened squares in the row 91 of the console 201 in FIG. 4A. The lamps 28 below each depressed key illuminate by means of electrical circuits, to be discussed below. The operator of the console 202 depresses the keys 26 in the positions (92;82), (92;83), (92;84), and (92;86) and the corresponding lamps 28 located below each depressed key 26 illuminates as illustrated by the darkened squares in the row 92 of the console 202 in FIG. 4A. Since only the response receiving features of the consoles 203-208 are being described in this example, the operators of the consoles 203-208 do not make any responses on their keyboards 24. Because the console 201 and the console 202 are operating in the individual display mode, no lamp 28 illuminating signals are transmitted to the remaining consoles 203-208 and the operator of consoles 203-208 do not observe any illuminated lamps 28 on their consoles 203-208. If the operator of console 201 chooses to transmit lamp 28 illuminating signals to the other consoles 202-208, he may select a group display mode (by means to be described below) and the lamps 28 located beneath the undepressed keys 26 in the positions (91;81), (91;82), (91;83), and (91;87) on the remaining consoles 202-208 will illuminate as illustrated by the darkened squares in the row 91 in FIG. 4B. The operator of the console 201 will continue to observe the illuminated lamps 28 beneath the depressed keys 26 at the positions (91;81), (91;82), (91;83), and (91;87). The operator of the console 202 will continue to observe the illuminated lamps 28 beneath the depressed keys 26 at the positions (92;82), (92;83), (92;84), and (92;86) but will now also observe the illuminated lamps 28 beneath the undepressed keys 26 at the positions (91;81), (91;82), (91;83), and (91;87) being illuminated by lamp 28 illuminating signals transmitted over the electric cable 22 by the operator of the console 201. The operators of the consoles 203–208 will each observe the illuminated lamp 28 beneath the undepressed keys 26 at the position (91;81), (91;82), (91;83), and (91;87) being transmitted over the electric cable 22 by the operator of the console 201. Since the operators of the consoles 202–208 do not know who was assigned to what row, they cannot associate the appearance of the illuminated lamps 28 in the row 91 with any one operator. Thus, the operator of the console 201 may select the group display mode with a reasonable assurance of anonymity. If the operator of the console 202 now selects the group display mode (by means to be described below), the lamps 28 beneath the undepressed keys 26 at the positions (92;82), (92;83), (92;84), and (92;86) on the remaining consoles 201, and 203–208 will illuminate as illustrated by the darkened squares in FIG. 4C. The operator of the console 201 will continue to observe the illuminated lamps 28 located beneath the undepressed keys 26 at the positions (91;81), (91;82), (91;83), and (91;87) and will now observe the illuminated lamps 28 located beneath the undepressed keys 26 at the positions (92;82), (92;83), (92;84), and (92;86) caused by lamp 28 illuminating signals being transmitted from the console 202. The operator of the console 202 will continue to observe the illuminated lamps 28 located beneath the undepressed keys 26 at the positions (91;81), (91;82), (91;83), and (91;87) as well as the illuminated lamps 28 located beneath the depressed keys 26 at the positions (92;82), (92;83), (93;84), and (93;86). The operators of the consoles 203–208 will observe the illuminated lamps 28 located beneath the undepressed keys 26 at the positions (91;81), (91;82), (91;83), and (91;87) caused by lamp 28 illuminating signals transmitted from the console 201, and will now observe the illuminated lamps 28 located beneath the undepressed keys 26 at the positions (92;82), (92;83), (92;84), and (92;86) caused by lamp 28 illuminating signals being transmitted from the console 202. As mentioned above, the operators of the consoles 201–208 do not know who was assigned to what row and cannot identify the appearance of illuminated lamps 28 on the keyboard 24 with any one operator. Thus, all the operators have a reasonable assurance of anonymity when selecting the group display mode. As is evident from the above example, each operator may elect to transmit his responses to all the remaining consoles 201–208 but he cannot prevent the reception of lamp 28 illuminating signals by his console 201 from other consoles operating in the group display mode. In addition, each operator may only transmit lamp 28 illuminating signals from his console 201 to all the remaining consoles 202–208 as distinguished from transmitting lamp 28 illuminating signals to less than all the remaining consoles 202–208. In the above example, each console 201–208 operator was assigned a row in which to record his responses. In other examples to follow, each operator may be assigned one or more rows or allowed to respond on the entire keyboard 24.

In addition to the structure of the consoles 201–208 described above, each one of the consoles 201–208 has, as illustrated in FIG. 2, a row 99 of cancel keys 30 located below the row 98 to cancel key 26 responses, an ON-OFF switch 32 located to the right of the column 87 to apply electrical power to the console 201, and a display selection switch 34 also located to the right of the column 87 to allow selection of an individual display mode or a group display mode. As shown in FIG. 5A, 5B and 5C, every console 201–208 has an opaque observation shield 36 located on three sides. The observation shield 36 hinders observation of the keyboard 24, the ON-OFF switch 32, and the display selection switch 34 by anyone other than the operator of the console 201.

Figure 3B:
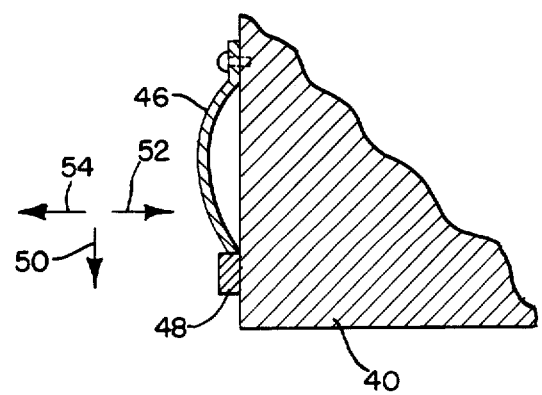
FIG. 3B is a partial cross section view of the latching means portion of the keyboard key switch and indicator assembly illustrated in FIG. 3A.

Each of the forty-two keys 26 is operably coupled to a switch and indicator assembly 38 as illustrated in FIG. 3A having an undepressed position and a depressed position with means to latch into the depressed position. A commercially available assembly successfully used in a prototype of the preferred embodiment having eight latching key actuated switches formed into a column with an unlatching key at the base of the column is Part No. L7S09322P16W00, manufactured by the UID Electronic Corporation of Hollywood, Florida. Since the structure of each switch and indicator assembly 38 is identical, the structure of the switch and indicator assembly 38 at the position (91;81) will be described as illustrative of the structure of all the switch and indicator assemblies 38. As shown in FIG. 3A, each key 26 is operably coupled to any well known double pole double throw slide switch 40 through coupling means 42 and is urged toward the undepressed position by resilient coil spring 44. An illuminatable lamp 28 is located below the key 26 surface to display illuminated evidence of a response by means of an electrical circuit to be discussed below. The key 26 is detachably attached to the coupling means 42 to allow replacement of the lamp 28 and is fabricated from a translucent material, preferably plastic, to transmit light from the lamp 28 to the operator. When each key 28 is depressed, the switch and indicator assembly 38 latches into the depressed position by means of any well known latching means such as resilient leaf spring 46 and latch pin 48. The latch pin 48 is operably coupled to the key 26 by means not shown and as can best be seen in FIG. 3B, when the key 26 is depressed, the latch pin 48 moves downward in the same direction as the arrow 50 and the leaf spring 46 moves in the direction of the arrow 52 to prevent the upward movement of the latch pin 48, thereby latching the switch and indicator assembly 38 and the key 26 into the depressed position. When a key 26 is depressed, the lamp 28 associated with the key 26 illuminates by means of the electrical circuits to be discussed below. A cancel key 30 located below each column 81–87 is operably coupled to the leaf spring 46 of each switch and indicator assembly 38 in the column by a sliding link (not shown). Depressing the cancel key 30 causes the sliding link (not shown) to displace each leaf spring 46 in the column above the cancel key 30 in the direction of the arrow 54 allowing the bias spring 44 to displace the latch pin 48 and key 26 upward, thereby returning the switch and indicator assembly 38 to the unlatched, undepressed position. The ON-OFF switch 32, which may be a rocker switch, is used to apply electrical power to each console 101 through a power supply circuit to be described below. The display selection switch 34, which may also be rocker switch, allows the operator of a console 201 to select an individual display mode or a group display mode. As demonstrated by the example recited hereinabove, no lamp 28 illuminating signals are transmitted from the console 201 to the remaining consoles 202–208 when the console 201 is operating in individual display mode. As also demonstrated by the example recited hereinabove, the selection of a group display mode causes the transmitting of lamp 28 illuminating signals from the console 201 to all the remaining consoles 202–208. Thus, the operator of any console 201–208 may observe illuminated lamps 28 from beneath depressed keys 26 he has actuated to the depressed position as well as illuminated lamps 28 from beneath undepressed keys 26 illuminated by lamp 28 illuminating signals from other consoles 202–208 operating in the group display mode.

Figure 7:
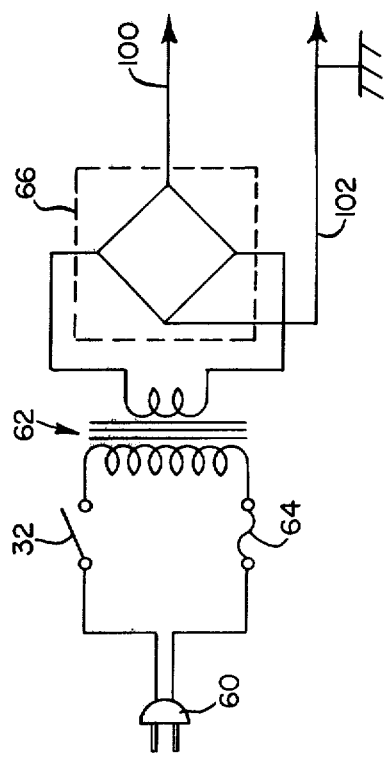
FIG. 7 is a circuit diagram of a typical power supply which may be utilized with the present invention.
Figure 8:
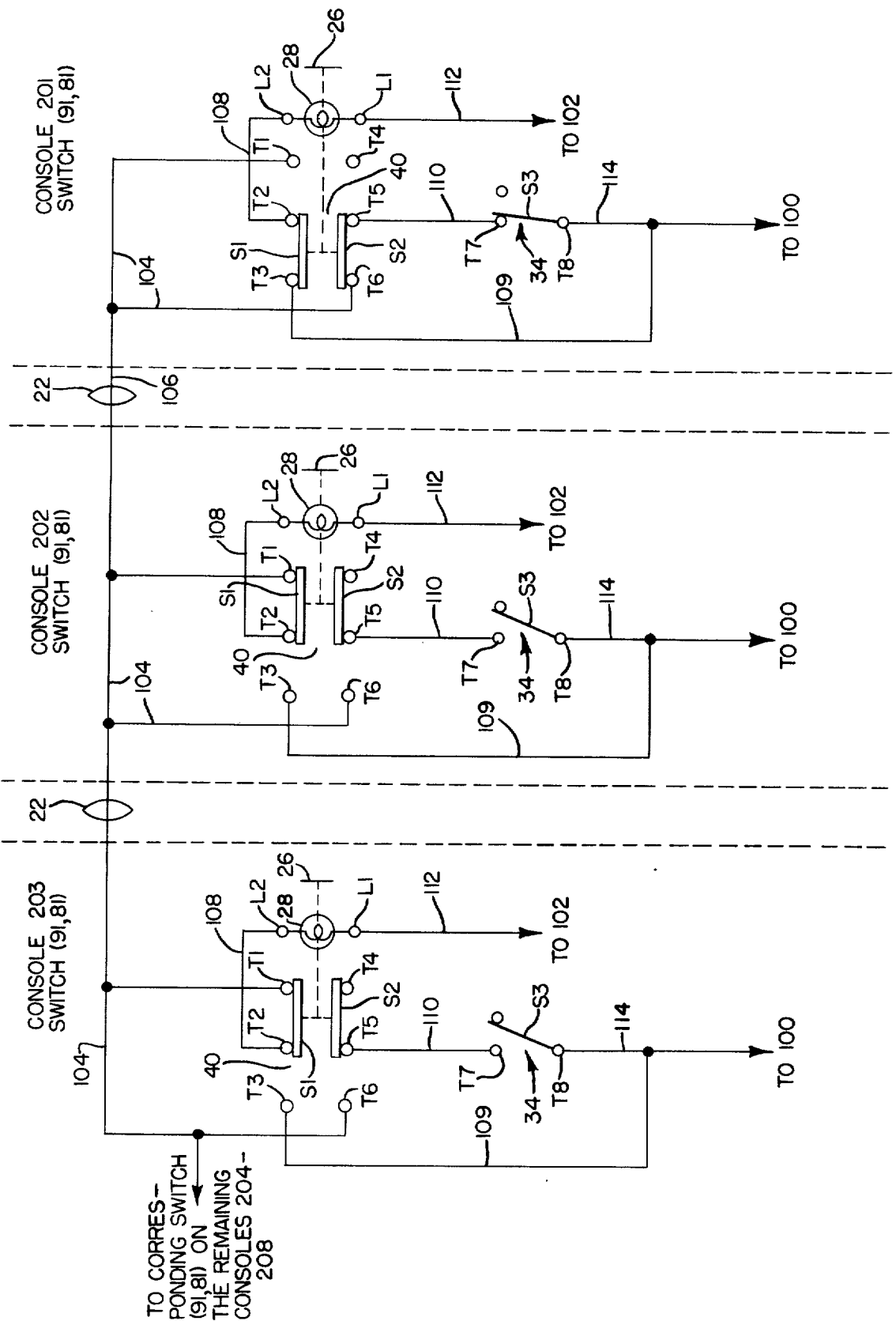
FIG. 8 is a circuit diagram of a typical switch and indicator assembly in three separate response recording and display consoles.
Figure 9:
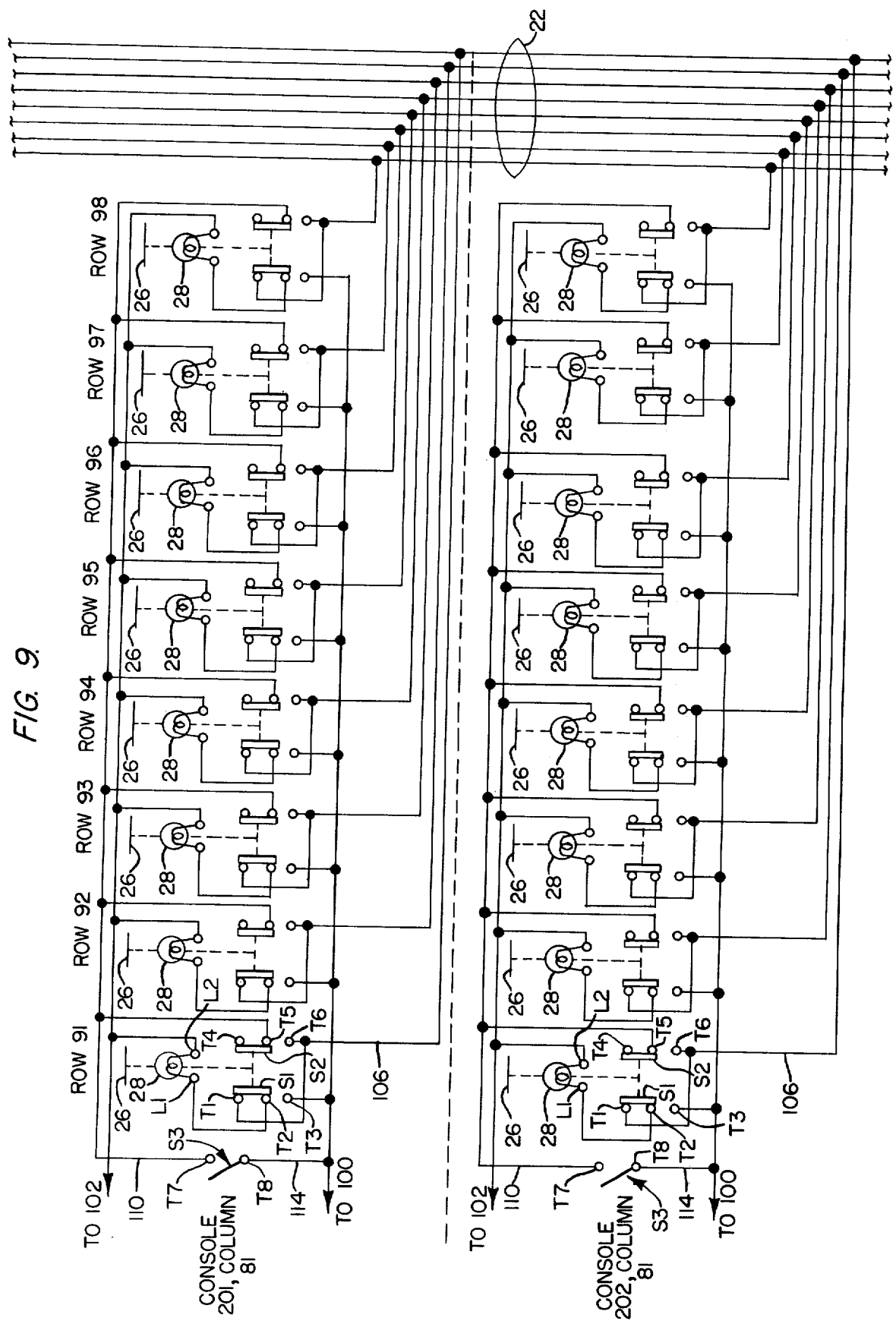
FIG. 9 is a circuit diagram of a typcial column of switch and indicator assembly on two separate response recording and display consoles.

The consoles 201–208 perform the response recording, response transmitting and response receiving functions by means of the electrical circuits illustrated in FIGS. 7, 8, and 9. FIG. 7 is a typical power supply circuit which may be utilized to supply operating power to the group of consoles 201–208, FIG. 8 illustrates the parallel wiring between a representative switch and indicator assembly 38 at the position (91;81) on the console 201 and its corresponding switch and indicator assembly 38 at the position (91;81) on the consoles 202, 203 and 204–208, and FIG. 9 illustrates the parallel wiring between a representative column 81 of switch and indicator assemblies 38 on the console 201 and its corresponding column 81 of switch and indicator assemblies 38 on the consoles 202, and 203–208. The wiring of the consoles 201–208 is a repetition of the basic parallel wiring circuit used to couple each switch and indicator assembly 38 at one position on each console 201–208 and is repeated for each of the forty-two switch and indicator assembly 38 positions. A circuit description of the switch and indicator assembly 38 at the position (91;81) as illustrated in FIG. 8 and of the column 81 of switch and indicator assemblies 38 as illustrated in FIG. 8 and of the column 81 of the switch and indicator assemblies 38 as illustrated in FIG. 9 is sufficient to provide an understanding of all the circuitry of the consoles 201–208.

The consoles 201–208 receive their operating electrical power through the well known power supply circuit illustrated in FIG. 7 including a power connector 60 electrically coupled to the primary of a step down transformer through ON-OFF switch 32 and protective fuse 64, and a solid state bridge rectifier 66 electrically coupled to the secondary of the transformer 62. The output of the power supply is an unfiltered 24 volt DC potential supplied between the lead 100 and the lead 102. The lead 102 is at zero potential and is hereinafter referred to as ground. The lead 100 is at a potential of plus 24 volts DC with respect to ground. The 24 volt DC potential is hereinafter referred to as the supply voltage. Each of the response recording and display consoles 201–208 may have its own power supply or two or more of the consoles 208 may share the same power supply.

As illustrated in FIG. 8, each slide switch 40 consists of a set of electrical contacts which provide both a single pole single throw and a single pole double throw switching function, and each display selection switch 34 is a single pole single throw switch. The structure and electrical function of the switch 40 in the position (91;81) on the console 201 as shown in FIG. 8 will be described as illustrative of all the switches 40, the electrical function of the display selection switch 34 on the console 201 in FIG. 8 will be described as illustrative of all the display selection switches 34 and the electrical function of the lamp 28 in the position (91;81) will be described as illustrative of the function of all the lamps 28. Each switch 40 has six terminals: T1, T2, T3, T4, T5 and T6 and two moveable electrically conductive slides, S1 and S2 to provide electrically conductive paths between the terminals. The slides S1 and S2 are mechanically linked to both the key 26 (FIG. 3A) and to one another but are electrically insulated from one another. The switch and indicator assembly 38 is urged to the undepressed state by the spring 44 (FIG. 3A). In the undepressed position, the slide S1 establishes electrical contact between the terminal T1 and the terminal T2 and the slide S2 establishes electrical contact between the terminal T4 and the terminal T5, as shown by the undepressed switch 40 in the position (91;81) on the console 202 in FIG. 8. When the key 26 is depressed, the slide S1 is moved so as to interrupt the electrical contact between the terminal T1 and the terminal T2 and establish electrical contact between the terminal T2 and the terminal T3, and the slide S2 is moved so as to interrupt the electrical contact between the terminal T4 and the terminal T5 and establish electrical contact between the terminal T5 and the terminal T6, as shown by the depressed switch 40 in the position (91;81) on the console 201 in FIG. 8. Each display selection switch 34 has two terminals, a terminal T7 and a terminal T8 and an electrically conductive link S3 to establish and interrupt electrical contact between the terminal T7 and the terminal T8. Each lamp 28 has two terminals, the terminal L1 and the terminal L2.

The terminal T1 of each switch 40 is electrically coupled to the terminal T6 of the same switch 40 through the lead 104 and is also electrically coupled to both the terminal T1 and the terminal T6 of the corresponding switch 40 in the position (91;81) on all the remaining consoles 202–208 through the lead 106 contained within the electrical cable 22. The terminal T2 of each switch 40 is electrically coupled to the terminal L2 of the lamp 28 associated with each switch 40 through the lead 108. The terminal T3 of each switch 40 is electrically coupled to the supply voltage at the lead 100 of the power supply illustrated in FIG. 7 through the lead 109. The terminal T5 of each switch 40 is electrically coupled to the terminal T7 of the display selection switch 34 through the lead 110. The terminal T4 of each switch 40 is not used. The terminal L1 of each lamp 28 is electrically coupled through lead 112 to the electrical ground at the lead 102 shown in FIG. 7. The terminal T8 of the display selection switch 34 is electrically coupled to the supply voltage at the lead 100 of the power supply illustrated in FIG. 7 through the lead 114. When the key 26 in the position (91;81) on console 201 is depressed to the response recording position, the slide S1 interrupts the electrical contact between the terminal T1 and the terminal T2 and establishes electrical contact between the terminal T2 and the terminal T3, and the slide S2 interrupts the electrical contact between the terminal T4 and the terminal T5 and establishes electrical contact between the terminal T6 and the terminal T5. When the slide S1 establishes contact between the terminal T2 and the terminal T3, the supply voltage flows from the lead 100 of the power supply illustrated in FIG. 7 through the lead 109 to the terminal T3, through the slide S1 to the terminal T2, through the lead 108 to the terminal L2 of the lamp 28, through the filament of the lamp 28 through the terminal L1 of lamp 28 and through the lead 112 to the ground. The current flowing through the lamp 28 causes the lamp 28 to illuminate. The light emitted from the illuminated lamp 28 serves to indicate a response to the console operator. When depressed to the response recording ON state, switch and indicator assembly 38 latches into the depressed state by means of the latching means illustrated in FIGS. 3A and 3B, and discussed hereinabove. If the display selection switch 34 on the console 201 is actuated to the group display mode, the conductive link S3 of the display selection switch 34 establishes electrical contact between the terminal T8 and the terminal T7. With the switch 40 in the position (91;81) remaining in the depressed position, the supply voltage flows from the power supply lead 100 shown in FIG. 7 through the lead 114 to the terminal T8, through the conductive link S3 to the terminal T7, through the lead 110 to the terminal T5 of the switch 40 in the position (91;81), through the slide S2 to the terminal T6, through the lead 104 and the lead 106 through the terminal T1 of the switch 40 in the position (91;81) on all the remaining consoles 202–208. The supply voltage flows from the terminal T1 of all the undepressed switches 40 in the position (91;81) on the consoles 202–208 through the slides S1 to the terminal T2 of the undepressed switches 40 in the position (91;81) through the leads 108 to the terminals L2 of the lamps 28 through the filaments of the lamps 28 to the terminals L2, through the leads 112 to the ground. The current flowing through each lamp 28 associated with each undepressed key 26 on the remaining consoles 202–208 causes each lamp 28 to illuminate. The illuminated lamps 28 on each of the consoles 202–208 serve as a visual indication to the operators of the consoles 202–208 that one of the operators has depressed the key 26 in the position (91;81) and depressed the display selection switch 34 to the group display mode. FIG. 9, showing a column 81 on two separate consoles 201 and 202 demonstrates the repetition of the basic circuit shown in FIG. 8.

The group of consoles as described hereinabove may be utilized for a variety of group communication situations including testing, training, education, and evaluation. The following examples relating to personality trait assessment, including both self assessment and peer assessment, career awareness training, and sensitivity training are illustrative of some of the group communication situations for which a group of consoles may be utilized. These examples are not intended in any way to limit the scope of the invention.

The consoles 201–208 may be utilized for personality trait assessment among the members of a group whereby a group member assesses his own personality traits by making appropriate responses on his console and then transmits his self assessment to the other group members, and thereafter the other group members may assess the personality traits of the first group member by making appropriate responses on their console and transmitting the responses either simultaneously or individually to the first group member. More specifically, the consoles 201–208 are arranged in the form of a circle, each group member being assigned a console. In this circular arrangement each group member can see every other group member and can readily speak to the other group members, but cannot observe the other group member's keyboard 24 because of the physical placement of the consoles 201–208 and the observation shields 36. Each console is equipped with a template 56 having multi-value questions relating to personality traits. The eight ememplary multi-value questions listed below are illustrative of the personality trait questions which may be used.

| ROW | COLUMN 81 | COLUMN 87 |
|---|---|---|
| 91 | Emotional | Emotionally controlled |
| 92 | Submissive | Dominant |
| 93 | Careless | Conscientious |
| 94 | Trusting | Suspicious |
| 95 | Self-assured | Apprehensive |
| 96 | Group dependent | Self sufficient |
| 97 | Relaxed | Anxious |
| 98 | Friendly | Aloof |

Figure 10:
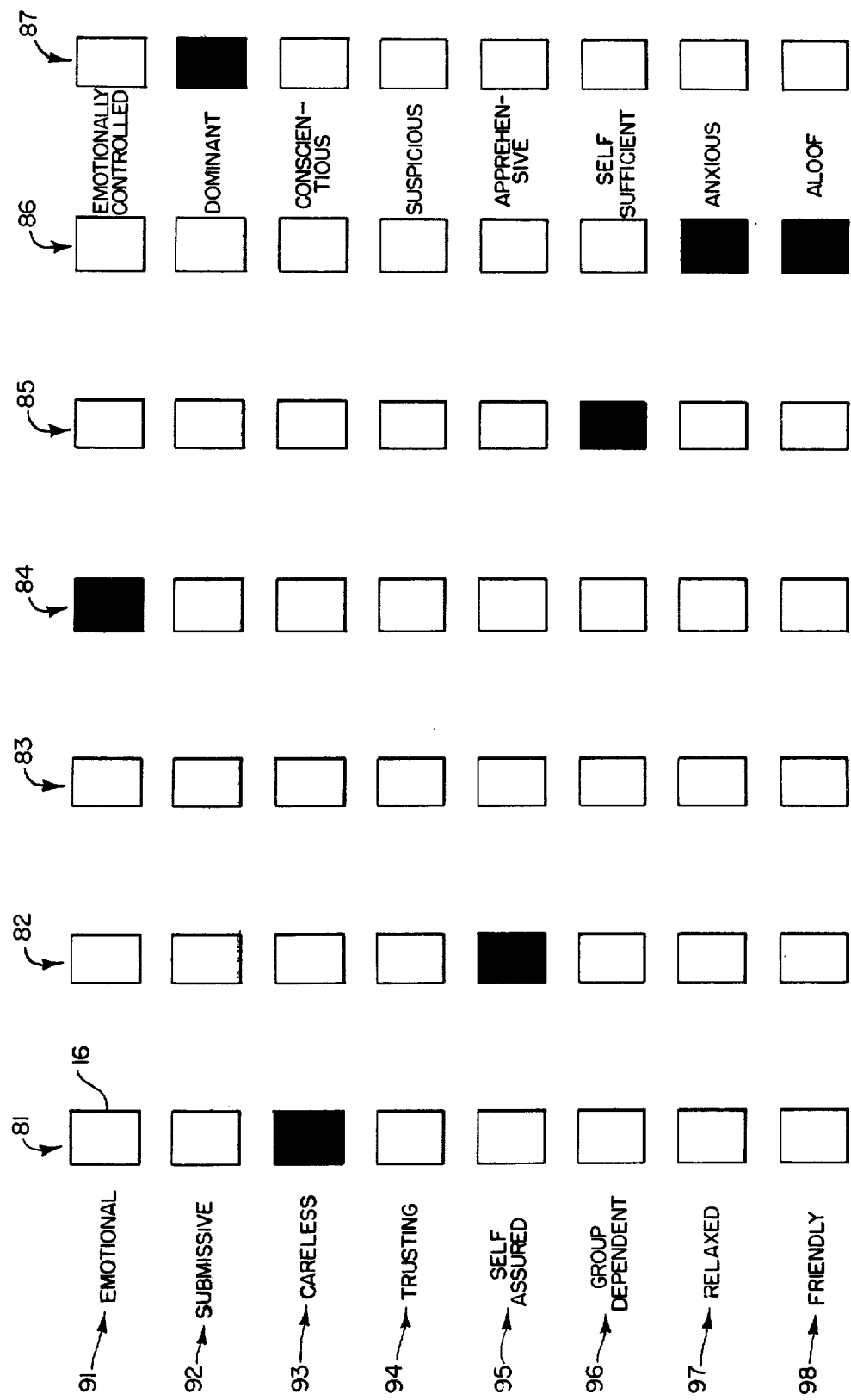
FIG. 10 is a schematic plan view showing a typical keyboard having fifty-six keys with selected keys darkened to illustrate a response indicating condition.

Each characteristic listed in column 81 is printed to the left of a key 26 in the column 81 and the reciprical characteristic listed in the column 87 is printed to the left of a key 26 in column 87. More specifically, the work "emotional" is printed to the left of the key 26 in the position (91;81) and the statement "emotionally controlled" is printed to the left of the key 26 in the position (91;87) as illustrated in the row 91 of FIG. 10. The remaining personality traits are printed on the template 56, as also illustrated in FIG. 10. For the purposes of this example, the operator of the console 201 is hereinafter designated as the first group member and is the first group member to participate in the personality trait assessment by assessing himself, and then allowing the remaining group members to assess him. After determining that his console 201 is in the individual display mode, the first group member subjectively determines his location between the two extremes for the eight characteristics listed. For the "emotional" trait listed in row 91, the key 26 in the position (91;81) represents the "emotional" extreme, the key 26 in the position (91;87) represents the "emotionally controlled" extreme, the key 26 in the position (91;84) represents the emotionally ambivalent midpoint. The first group member may feel that he is emotionally ambivalent and depress the key 26 in the position (91;84), that he is very dominant and depress the key 26 in the position (92;87), that he is very careless, and depress the key 26 in the position (93;81), that he is reasonably self assured, and depress the key 26 in the position (95;82), that he is relatively self sufficient and depress the key 26 in the position (96;85), that he is rather anxious and depress the key 26 in the position (97;86), that he is rather aloof and depress the key 26 in the position (98;86) as illustrated by the darkened square in FIG. 10. As each key 26 is depressed, the lamp 28 located below that key 26 will illiminate by means of the electrical circuits discussed above as a visual indication of the response. After completing his responses to the eight multi-value statements on the template 56, the first group member depresses the display selection switch 34 on his console 201 to the group display mode to transmit his responses to the remaining group members. Each remaining group member observes the pattern of eight illuminated lamps 28 represented by the darkened squares in FIG. 10 on his console, each illuminated lamp 28 corresponding to a depressed key 26 on the first group member's console 201. In this way, a group member's self assessment is communicated to the remainder of the group for discussion and evaluation. Should it be necessary for a group member to have a permanent record of the responses, he may mark the space to the left of each depressed key 26 with a colored pencil. The personality trait self assessment of the first group member is now completed, and the first group member resets the group of consoles 201–208 to prepare for the personality trait peer assessment. The first group member clears the responses from all the consoles 201–208 by depressing the display selection switch 34 on his console 201 to the individual display mode and clears the responses on his own console 201 by depressing the cancel keys 30 located at the bottom of each column 81–87. The remaining group members may then conduct a peer assessment of the first group member. Each of the remaining group members conducts a peer personality trait assessment by depressing an appropriate key 26 for each of the multi-value statements. After the last group member has completed his responses, all the group members may transmit their peer trait evaluations of the first group member to the first group member in one of two ways. The group members may choose to transmit their responses in a successive serial manner. That is, the operator of console 202 depresses his display selection switch 34 to the group display mode, thus transmitting the responses on his console 202 to all the remaining group members including the operator of console 201. After the operator of console 201 views the evaluation of the operator of console 202, the operator of the console 202 switches back to the individual mode, causing the illuminated lamps 28 to extinguish. The operator of console 203 then depresses the display selection switch 34 on his console 203 to the group display mode transmitting his evaluation to the remaining group members including the operator of console 201. This procedure is continued until all the group members have transmitted their evaluations to the operator of console 201. Because the operator of the console 201 will observe seven peer evaluations, he may mark the space adjacent to each key 26 with a different color pencil for each evaluation. In this manner the operator of the console 201 has a comparative record of his self evaluation and the individual evaluations of his peers. A second method by which the group members may transmit their evaluations of the first group member to the first group member is by having all the group members substantially simultaneously depress their display selection switches to the group display mode to simultaneously transmit their evaluations to the first group member. From the pattern of illuminated lamps 28 on the first group member's console 201, the first group member can determine how the group assesses him. In the event only one lamp 28 illuminates in a row, the first group member may assume that all the remaining group members have depressed the key 26 for the position corresponding to the position of the illuminated lamp 28. Where two or more lamps 28 illuminate in any one row, the first group member cannot determine how many individuals depressed the keys 26 corresponding to each illuminated lamp 28 position. For example, if the lamps 28 in the positions (91;81) and (91;87) illuminate, the first group member cannot determine how many of the remaining group members depressed the key 26 in the position (91;81) and how many of the remaining group members depressed the key 26 in the position (91;87). Since the group members switch into the group display mode substantially simultaneously, the first group member cannot readily associate the appearance of one of the seven display patterns with any one group member. Each group member thus maintains a reasonable assurance of anonymity which allows the group members to respond without fear that his response can be attributable to him by the first group member. The opaque observation shield 36 located on each console 201–208 and the physical placement of the consoles 201–208 prevents one group member from viewing the response made by another group member.

Figure 11:
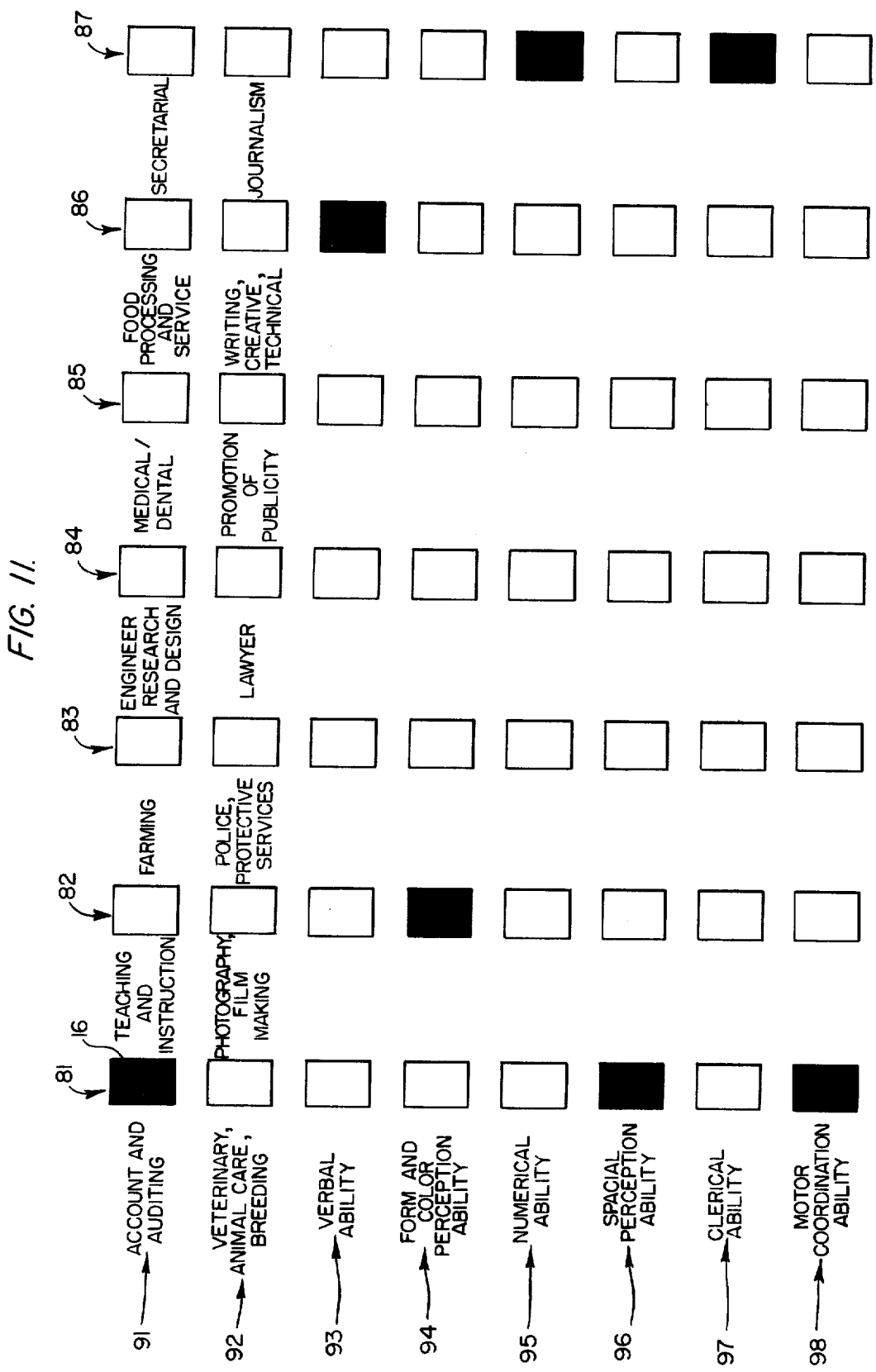
FIG. 11 is a schematic plan view showing a typical keyboard having fifty-six keys with selected keys darkened to illustrate a response indicating condition.

The consoles 201–208 may also be utilized for career awareness training. Each console 201–208 is provided with a template 56 having one vocational field printed to the left of each key 26 located in the row 91 and the row 92 as illustrated in FIG. 11. The following fourteen exemplary vocational fields may be utilized.

(91;81) Accounting and auditing.
(91;82) Teaching and instruction.
(91;83) Farming.
(91;84) Engineering research and design.
(91;85) Medical and dental.
(91;87) Secretarial.
(92;81) Veterinarian animal care and breeding.
(92;82) Photography and film making.
(92;83) Police and protective services.
(92;84) Lawyer.
(92;85) Promotion and publicity.
(92;86) Writing, creative and technical.
(92;87) Journalism.

The remaining six rows 93–98 are utilized to record the responses of the console operators with respect to work factors related to the vocational fields. The following six exemplary work factors may be printed to the left of the key 26 in the column 81 as shown in FIG. 11.

(93;81) Verbal ability.
(94;81) Form and color perception ability.
(95;81) Numerical ability.
(96;81) Spacial perception ability.
(97;81) Clerical ability.
(98;81) Motor coordination ability.

In using the consoles to develop a career awareness among the group members, a group moderator operating a console 201 selects one of the fourteen vocational fields located in the first two rows 91 and 92 for discussion by depressing an appropriate key 26 and then depressing his display selection switch 34 to the group display mode. For example, a group moderator may select "accounting and auditing" and depress the key 26 in the position (91;81) as represented by the darkened square (91;81) shown in FIG. 11. After the group moderator depresses his display selection switch 34 to the group display mode, the remaining group members observe a lamp 28 in the position (91;81) illuminate on their console 202–208 as an indication of the group moderator's "accounting and auditing" selection. A group member is then asked by the group moderator to evaluate the vocational field selected in terms of the work factors assigned to the rows 93–98.

Depressing a key 26 in the column 81 of the rows 93–98 indicates that very little of the work factor is required in the vocational field, depressing a key 26 in the column 87 of the rows 93–98 indicates a great deal of the work factor is required in the vocational field, and depressing a key 26 in the column 84 of the rows 93–98 indicates only an average amount of the work factor is required in the vocational field. The responding group member, in evaluating the vocational field choice of the group moderator may feel that greater than average verbal ability is required for auditing and accounting and depress the key 26 in the position (93;86), but less than average form and color perception ability is required and depress the key 26 in the position (94;82), that far greater than average numerical ability is required and depress the key 26 in the position (95;87), that far less than average spacial perception ability if required and depress the key 26 in the position (91;96), that far greater than average clerical ability is required and depress the key 26 in the position (97;87) and that far less than average motor coordination ability is required and depress the key 26 in the position (98;81). The group member transmits his response to the remainder of the group, including the group moderator for discussion and evaluation by depressing his display selection switch 34 to the group display mode.

Figure 12:
FIG. 12 is a schematic plan view showing a typical keyboard having fifty-six keys with selected keys darkened to illustrate a response indicating condition.

The group of consoles 201-208 also may be used to increase the sensitivity a teacher has for his students by communicating the student's feelings with respect to the teacher. The nature of the student-teacher relation is such that a student may attempt to avoid the disapproval of the teacher, or seek the approval of the teacher by conveying an inaccurate indication of his feelings. In this situation, it is preferable that information be transferred from the students to the teacher anonymously. The consoles 201-208 are arranged to form a circle, a student at each of seven consoles and the teacher assigned to the eighth console. In this configuration, each operator can observe the others but cannot observe any other keyboards 24 because of the physical placement of the consoles 201-208 and the observation shields. Each console 201-208 is supplied with a template 56 having areas of student concern listed to the left of each key 26 in the column 81. A template 56 having the eight exemplary areas of student concern listed below is shown in FIG. 12. The darkened squares in FIG. 12, to be discussed below, represent depressed keys 26.

(91;81) Treating student fairly.
(92;81) Respect for the student.
(93;81) Level of Rapport.
(94;81) Student Involvement allowed.
(95;81) Homework emphasis.
(96;81) Discipline.
(97;81) Punishment assignments.
(98;81) Out of class activities.

Depressing any of the keys 26 in the column 81 indicates that the student feels the teacher's attitude is inadequate, depressing any of the keys 26 in the column 84 indicates that the student feels the teacher's attitude is sufficient, and depressing any of the keys 26 in the column 87 indicates the student feels the teacher's attitude is excessive. The evaluation is conducted by having each student record his responses on his keyboard 24 with his console in the individual display mode. For instance, a student may feel that the teacher treats his student somewhat unfairly and depress the key 26 in the position (91;83), that the teacher possesses a sufficient level of respect for the students and depress the key 26 in the position (92;84), the teacher's level of rapport with the students is less than sufficient and depress the key 26 in the position (93;82), the teacher's willingness to allow student involvement is much less than sufficient and depress the key 26 in the position (94;81), that the emphasis on homework is excessive and depress the key 26 in the position (95;87), that discipline is sufficient and depress the key 26 in the position (96;84), that punishment assignments are somewhat more than sufficient and depress the key 26 in the position (97;85), and that out of class activities are much more than sufficient and depress the key 26 in the position (98;86). If after depressing a key 26 a student decides to change his selection he may do so by depressing the cancel key 30 in the row 99 for the column in which he wishes to make a change. After pressing the cancel key 30 all the depressed keys 26 in the column above the depressed cancel key 30 return to the undepressed position and the student may make another choice. The student evaluation is transmitted to the teacher by having all the students substantially simultaneously depress their display selection switches 34 from the individual display mode to the group display mode. From the pattern of illuminated lamps 28 that emerge on the teacher's console, the teacher can obtain the collective feelings of the students. Since the students switch into the group display mode substantially simultaneously, the teacher cannot readily associate the appearance of one of seven display patterns with one student. Each student has a reasonable assurance of anonymity which allows the group member to respond without fear that his response can be attributable to him by the teacher.

The three examples given above are merely illustrative of the many and varied group communication situations to which the group of consoles can be applied. Being illustrative, the examples are not intended to limit the scope of the invention in any way.

As is apparent to those skilled in the art, various changes and modifications may be made to the group of interconnected consoles described herein without departing from the scope and spirit of the present invention.

What is claimed is:

1. An apparatus for the selective transmitting and receiving of responses between a plurality of console operators comprising:
  a plurality of response recording and response display consoles;
  electrical interconnection means operably coupling the consoles;
  each of the consoles including a plurality of electrical switches each having a plurality of stable states including a response recording state and a non-response recording state;
  each of the consoles including a plurality of response indicating lamps;
  each lamp operably associated through electrical circuitry with a corresponding one of the switches on the same console and also operably associated through the interconnection means with a corresponding one of the lamps on each of the other consoles;
  each of the consoles including a console operator actuable display selection switch adapted to interrupt the electrical association between the lamps on the same console and the corresponding lamps on each of the other consoles.

2. The apparatus as recited in claim 1, in which each switch further includes;
  a key actuated bi-state electrical switch.

3. The apparatus as recited in claim 1, further comprising:
  means operably coupling the
    switches to the response indicating lamps whereby actuation of a switch to the response recording state causes the corresponding response indicating lamp to enter the response indicating state.

4. The apparatus as recited in claim 3 wherein;

the response indicating lamps are located within corresponding ones of the response recording switches.

5. The apparatus as recited in claim 3, in which the display selection switch includes;
a group display mode for transmitting response indicating signals from a console to the corresponding response indicating lamps on each of the remaining consoles through the interconnection means.

6. The apparatus as recited in claim 5, in which the interconnection means includes;
parallel electrical coupling means interconnecting the switches on at least one console with the corresponding switches on at least one of the other consoles through the corresponding display selection switch.

7. The apparatus as recited in claim 6 in which;
the response recording means are so located as to form an ordered array.

8. The apparatus as recited in claim 7 in which;
the response recording means ordered array further includes rows and columns of response recording means.

9. The apparatus as recited in claim 6 in which;
the response indicating display means are so located as to form an ordered array.

10. The apparatus as recited in claim 9 in which;
the response indicating display means ordered array further includes rows and columns of response indicating display means.

11. The apparatus as recited in claim 6 further comprising;
latching means operably coupled to each response recording means for latching each response recording means into the response recording state.

12. The apparatus as recited in claim 11 further comprising;
unlatching means operably coupled to the latching means of each response recording means to unlatch a response recording means from the response recording state.

13. The apparatus as recited in claim 1, further comprising;
a replaceable template for each console formed from sheet material having a plurality of apertures corresponding to the response recording means.

14. The apparatus as recited in claim 13 in which;
the template has a portion adjacent to at least one aperture with printed matter whereby the operator of a console may perceive functions relating to the use of the response recording means.

15. The apparatus as recited in claim 14 in which;
the printed matter is a bi-value question whereby the console operator may respond to the bi-value question by actuating the response recording means adjacent to the bi-value question.

16. The apparatus as recited in claim 14 in which;
the printed matter adjacent to selected apertures in a row of response recording means relates to a multi-value question whereby the console operator may respond to the multi-value question by actuating at least one of the response recording means in the row of response recording means.

17. The apparatus as recited in claim 14 in which;
the printed matter adjacent to selected apertures in a column of response recording means relates to a multi-value question whereby the console operator may respond to the multivalue question by actuating at least one of the response recording means in the column of response recording means.

18. The apparatus as recited in claim 1, further comprising;
a replaceable template for each console formed from sheet material having a plurality of apertures so located as to correspond in position with each response indicating lamps.

19. The apparatus as recited in claim 18 in which;
printed matter is located on the template adjacent selected apertures whereby the operator of a console may perceive the significance of selected response indicating display means.

20. The apparatus as recited in claim 18 wherein;
the response indicating lamps are located within corresponding ones of the switches.

21. The apparatus as recited in claim 1, further comprising;
observation shield means associated with the consoles.

* * * * *